United States Patent
De Luca et al.

(10) Patent No.: US 9,315,312 B2
(45) Date of Patent: Apr. 19, 2016

(54) DOMED MULTILAYER CUSHIONING ARTICLE

(75) Inventors: Nicolas P. De Luca, Washington, DC (US); Robert Brill, Arnold, MD (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 574 days.

(21) Appl. No.: 13/338,866

(22) Filed: Dec. 28, 2011

(65) Prior Publication Data
US 2013/0171422 A1    Jul. 4, 2013

(51) Int. Cl.
| | |
|---|---|
| *B32B 3/24* | (2006.01) |
| *B32B 3/26* | (2006.01) |
| *B32B 3/28* | (2006.01) |
| *B32B 7/04* | (2006.01) |
| *B32B 7/12* | (2006.01) |
| *B32B 27/08* | (2006.01) |
| *B32B 29/00* | (2006.01) |
| *B65D 81/03* | (2006.01) |
| *B65D 81/05* | (2006.01) |
| *B65D 81/38* | (2006.01) |
| *B65D 81/127* | (2006.01) |

(52) U.S. Cl.
CPC . *B65D 81/03* (2013.01); *B32B 3/26* (2013.01); *B32B 3/266* (2013.01); *B32B 3/28* (2013.01); *B65D 81/3888* (2013.01); *B32B 7/04* (2013.01); *B32B 7/12* (2013.01); *B32B 27/08* (2013.01); *B32B 29/005* (2013.01); *B32B 2307/30* (2013.01); *B32B 2553/00* (2013.01); *B32B 2553/02* (2013.01); *B65D 81/127* (2013.01); *B65D 81/3893* (2013.01); *Y10T 428/24174* (2015.01); *Y10T 428/24182* (2015.01); *Y10T 428/24281* (2015.01); *Y10T 428/24289* (2015.01); *Y10T 428/24314* (2015.01); *Y10T 428/24322* (2015.01); *Y10T 428/24331* (2015.01); *Y10T 428/24612* (2015.01); *Y10T 428/24661* (2015.01); *Y10T 428/24826* (2015.01)

(58) Field of Classification Search
None
See application file for complete search history.

(56) References Cited

U.S. PATENT DOCUMENTS

| 493,929 A | 3/1893 | Holcomb |
|---|---|---|
| 1,396,269 A | 11/1921 | Eckart |

(Continued)

FOREIGN PATENT DOCUMENTS

| EP | 690002 A1 * | 1/1996 | |
|---|---|---|---|
| JP | 09012061 A * | 1/1997 | ............. B65D 81/07 |

(Continued)

OTHER PUBLICATIONS

English Abstract for JP 09012061 A, Jan. 1997.*

*Primary Examiner* — Jeff Vonch
(74) *Attorney, Agent, or Firm* — Capitol City TechLaw; Jasbir Singh

(57) ABSTRACT

A cushioning article comprises a flap-cut sheet with a plurality of discrete sets of flaps, with each discrete set of flaps having a plurality of flaps extending outward from the sheet. A plurality of the outwardly extending flaps of each discrete set of flaps are affixed to a discrete cap member, resulting in a composite dome sheet having a plurality of composite domes extending from the flap-cut sheet. A cushioning and thermal protection packaging article for packaging a thermally-sensitive product utilizes a plurality of the layers of the composite dome sheet with each layer separated by a separating sheet. Both the composite dome sheet and the separating sheet can be made of paper.

25 Claims, 11 Drawing Sheets

(56) References Cited

U.S. PATENT DOCUMENTS

| | | | | |
|---|---|---|---|---|
| 1,720,579 | A | * | 7/1929 | Tiemann .................. 217/26.5 |
| 1,958,050 | A | | 2/1930 | Koppelman |
| 1,902,361 | A | * | 3/1933 | Hamersley ............ B65D 65/44 217/3 CV |
| 1,945,024 | A | * | 1/1934 | Coil ...................... B65D 65/44 162/116 |
| 1,984,653 | A | * | 12/1934 | Palmer .................... E04B 1/80 404/44 |
| 2,064,122 | A | * | 12/1936 | Krannert .................... 428/184 |
| 2,502,112 | A | | 3/1950 | Walker |
| 2,609,956 | A | * | 9/1952 | Stevenson .................... 217/42 |
| 2,622,051 | A | * | 12/1952 | Hermanson ........... B31F 1/2895 428/154 |
| 2,631,724 | A | * | 3/1953 | Wright ....................... 206/392 |
| 2,653,525 | A | * | 9/1953 | McGuire ................ E01C 9/086 404/35 |
| 2,744,624 | A | * | 5/1956 | Hoogstoel et al. ............ 206/426 |
| 3,187,979 | A | * | 6/1965 | Skowronski ............ 229/120.17 |
| 3,219,514 | A | * | 11/1965 | Struycken de Roysancour ....... A41D 31/0038 156/210 |
| 3,231,454 | A | * | 1/1966 | Williams ............... B65D 81/03 206/521 |
| 3,616,155 | A | * | 10/1971 | Chavannes ............. B32B 27/00 206/819 |
| 3,779,850 | A | | 12/1973 | Gerard |
| 3,797,658 | A | * | 3/1974 | Peacock ............... B65D 75/305 206/216 |
| 3,897,579 | A | | 7/1975 | Weinstein |
| 3,925,127 | A | | 12/1975 | Yoshioka |
| 4,015,544 | A | * | 4/1977 | Szatkowski .................. 108/51.3 |
| 4,026,198 | A | | 5/1977 | Ottaviano |
| 4,081,580 | A | * | 3/1978 | Kato ....................... B65D 81/24 229/164.1 |
| 4,280,648 | A | * | 7/1981 | Boursier .................... 206/521.1 |
| 4,487,136 | A | * | 12/1984 | Beckway ............. B65D 19/0028 108/51.3 |
| 4,850,284 | A | * | 7/1989 | DeGroot ............. B65D 19/0012 108/51.3 |
| 4,954,385 | A | * | 9/1990 | Samann ............... B65D 5/5035 206/521 |
| 5,052,559 | A | * | 10/1991 | Bressi, Jr. ............. B65D 81/261 206/525 |
| 5,205,112 | A | | 4/1993 | Tillotson et al. |
| 5,382,214 | A | * | 1/1995 | Mano ...................... B31D 5/00 108/54.1 |
| 5,388,531 | A | * | 2/1995 | Crews et al. .................. 108/51.3 |
| 5,538,778 | A | | 7/1996 | Hurwitz et al. |
| 5,558,923 | A | | 9/1996 | Vesamaa |
| 5,667,871 | A | | 9/1997 | Goodrich et al. |
| 5,688,578 | A | | 11/1997 | Goodrich |
| 5,782,735 | A | | 7/1998 | Goodrich et al. |
| 5,791,478 | A | * | 8/1998 | Kalvelage ............... A61J 1/035 206/531 |
| 5,897,481 | A | | 4/1999 | Baumuller |
| 6,123,302 | A | * | 9/2000 | Taylor ................... B05B 15/061 222/105 |
| 6,158,587 | A | * | 12/2000 | Emery ................... B65D 71/50 206/427 |
| 6,626,812 | B1 | | 9/2003 | Harding et al. |
| 6,926,947 | B1 | * | 8/2005 | Seckel ..................... B32B 1/00 206/585 |
| 7,380,509 | B1 | * | 6/2008 | Sternhamn ......... B65D 19/0026 108/51.11 |
| 8,112,907 | B2 | * | 2/2012 | Kim ..................... A43B 1/0009 36/3 R |
| 2005/0284789 | A1 | * | 12/2005 | Carespodi ............... B32B 15/08 206/461 |
| 2006/0127648 | A1 | * | 6/2006 | De Luca ............... B32B 27/065 428/174 |
| 2007/0095711 | A1 | * | 5/2007 | Thompson ........... B65D 5/2009 206/522 |
| 2007/0228036 | A1 | * | 10/2007 | Noyelle ............... B65D 5/5038 219/730 |
| 2008/0073240 | A1 | * | 3/2008 | Bowers ................. B65D 75/32 206/532 |
| 2009/0247382 | A1 | | 10/2009 | Bussey, III et al. |
| 2011/0162330 | A1 | * | 7/2011 | Cotton ................ B65D 75/327 53/476 |
| 2012/0104009 | A1 | | 5/2012 | Fascio |

FOREIGN PATENT DOCUMENTS

| | | |
|---|---|---|
| WO | 8607011 | 12/1986 |
| WO | 0124663 A1 | 4/2001 |
| WO | 02080717 A1 | 10/2002 |
| WO | 2009054723 A1 | 4/2009 |
| WO | 2011148115 A1 | 12/2011 |

* cited by examiner

DOMED MULTILAYER CUSHIONING ARTICLE

FIELD OF THE INVENTION

The invention is directed to cushioning for packaging and other end uses.

BACKGROUND OF THE INVENTION

A wide variety of materials and designs are used in cushioning for packaging. Packaging cushioning includes paper cushioning, open cell foam and closed cell foam cushioning, and cushioning articles made from films, such as air cellular cushioning. On a weight basis, paper products are less expensive than plastics, and most paper products are more readily biodegradable than most plastic articles. Paper cushioning includes crumpled paper, embossed paper, slit paper, and corrugated paper. It would be desirable to provide a paper-based cushioning article exhibiting cushioning performance comparable to plastic-based cushioning articles.

SUMMARY

A first aspect is directed to a cushioning article comprising a composite dome sheet comprising a flap-cut sheet having a plurality of discrete sets of intersecting flap-cuts therein. Each discrete set of intersecting cuts provides a discrete set of flap members integral with the flap-cut sheet. A plurality of individual flaps of each set extends outwardly from a portion of the flap-cut sheet that is between the discrete sets of flap-cuts. At least two of the outwardly extending flaps of each discrete set of flaps are affixed to a discrete cap member, to provide a plurality of composite domes extending from the flap-cut sheet.

In an embodiment, the flap-cut sheet comprises cellulose and the cap members also comprises cellulose. In a further embodiment, the flap-cut sheet is made from paper having a thickness of from 0.001 inch to 0.07 inch and each cap member is made from paper having a thickness of from 0.001 inch to 0.07 inch. The paper can be a kraft paper.

In an embodiment, the cap members are affixed to the outwardly extending flaps with an adhesive.

In an embodiment, the composite dome has a shape corresponding with a portion of at least one member selected from the group consisting of circular spheroid, oblate spheroid, prolate spheroid, cone, and polyhedron.

In an embodiment, each discrete set of intersecting flap-cuts comprises three straight cuts of equal length, with each flap-cut intersecting the other two flap-cuts at an included angle of sixty degrees.

In an embodiment, the cap member is present in a cap-cut sheet (i.e., the capping sheet) having a plurality of cap members, with each cap member having a discrete set of cap-cuts therearound, with each cap-cut in each set defining a portion of an edge of a discrete cap member, with each cap member being integral with the cap-cut sheet, with a plurality of cap members extending outwardly from a portion of the cap-cut sheet between the cap members. In the cap-cut sheet, the size and arrangement of the cap members substantially corresponds with the size and arrangement of the discrete sets of flap-cuts in the flap-cut sheet. The outwardly extending cap members are affixed to the outwardly extending flap members of the flap-cut sheet.

In an embodiment, each discrete cap member is adhered to a top surface of each discrete set of outwardly extending flap members. In an alternative embodiment, each discrete cap member is adhered to a bottom surface of each discrete set of outwardly extending flap members.

In an embodiment, the set of intersecting flap-cuts produces a first flap member, a second flap member, a third flap member, and a fourth flap member, with the first and third flap members extending outward from a first side of the flap-cut sheet, the first and third flap members being affixed to a first cap member adhered to the first side of the flap-cut sheet, and the second and fourth flap members extending outward from a second side of the flap-cut sheet, the second and fourth flap members being affixed to a second cap member adhered to second side of the flap-cut sheet.

In an embodiment, the flexible flap-cut sheet comprises a first thermoplastic polymer and the cap member comprises a second thermoplastic polymer. In a further embodiment, the first thermoplastic polymer comprises at least one member selected from the group consisting of polyester, polyamide, polystyrene, polylactic acid, polyvinylchloride, polyolefin, etc., and the second thermoplastic polymer comprises at least one member selected from the group consisting of polyester, polyamide, polystyrene, polylactic acid, polyvinylchloride, polyolefin, etc. In a further embodiment, the cap members are directly bonded to the flap members, such as by heat sealing, pressing, etc., without the use of adhesive or other binding agent. In a further embodiment, the cap members are heat sealed to the flap members. In a further embodiment, the cap members are affixed to the flap members with an adhesive. In a further embodiment, the composite dome has a shape corresponding with a portion of at least one member selected from the group consisting of circular spheroid, oblate spheroid, prolate spheroid, cone, and polyhedron. In an embodiment, the flap-cut sheet has a thickness of from 0.001 inch to 0.07 inch and the cap member has a thickness of from 0.001 inch to 0.07 inch. In an embodiment, each discrete set of intersecting flap-cuts comprises three straight cuts of equal length, with each cut intersecting the other two cuts at a lesser included angle of sixty degrees. In an embodiment, the cap member is present in a cap-cut sheet having a plurality of discrete cap members. Each cap-cut in each set defines a portion of an edge of a discrete cap member, with each cap member being integral with the cap-cut sheet. The cap members are sized and arranged to correspond with the size and arrangement of the discrete sets of flap-cuts in the flap-cut sheet, so that the cap-cut sheet is affixed to the flap-cut sheet at least to the extent that a plurality of cap members of the cap-cut sheet are respectively affixed to a plurality of discrete sets of outwardly extending flap members of the flap-cut sheet. In a further embodiment, the set of intersecting flap-cuts in the flap-cut sheet produces at least 4 flap members, with at least the first and third flap members being affixed to a first cap member on a first side of the flap-cut sheet and at least the second and fourth flap members being affixed to a second cap member on a second side of the flap-cut sheet.

A second aspect is directed to a cushioning and thermal protection packaging article for packaging a thermally-sensitive product. The cushioning and thermal protection packaging article comprises (A) a plurality of layers of at least one flap-cut sheet, and (B) a separating sheet between each of the layers of the at least one flap-cut sheet. The at least one flap-cut sheet has a plurality of discrete sets of intersecting flap-cuts therein. Each set of intersecting flap-cuts provides a discrete set of flap members integral with the flap-cut sheet. A plurality of individual flaps of each set extend outwardly from a portion of the flap-cut sheet between the sets of flaps, with the plurality of the outwardly extending flaps of each discrete set of flaps being affixed to a discrete cap member, to provide a composite dome extending from the portion of the flap-cut sheet between the flaps. Preferred flap-cut sheet(s), flaps, cap-cut sheets, caps, resulting composite dome sheets can be in accordance with the first aspect of the invention, described above.

In an embodiment, the flap-cut sheet is made from paper having a thickness of from 0.001 inch to 0.07 inch and each cap member is made from paper having a thickness of from 0.001 inch to 0.07 inch, and the separating sheets are made from paper having a thickness of from 0.001 inch to 0.07 inch.

In an embodiment, the cushioning and thermal protection packaging article comprises from 2 to 10 layers of the at least one flap-cut sheet surrounding six sides of a rectangular box holding the thermally-sensitive product.

In an embodiment, the cushioning and thermal protection packaging article comprises from 2 to 10 layers of the at least one or flap-cut sheet wrapped around the thermally-sensitive product.

DETAILED DESCRIPTION

Figure 1:
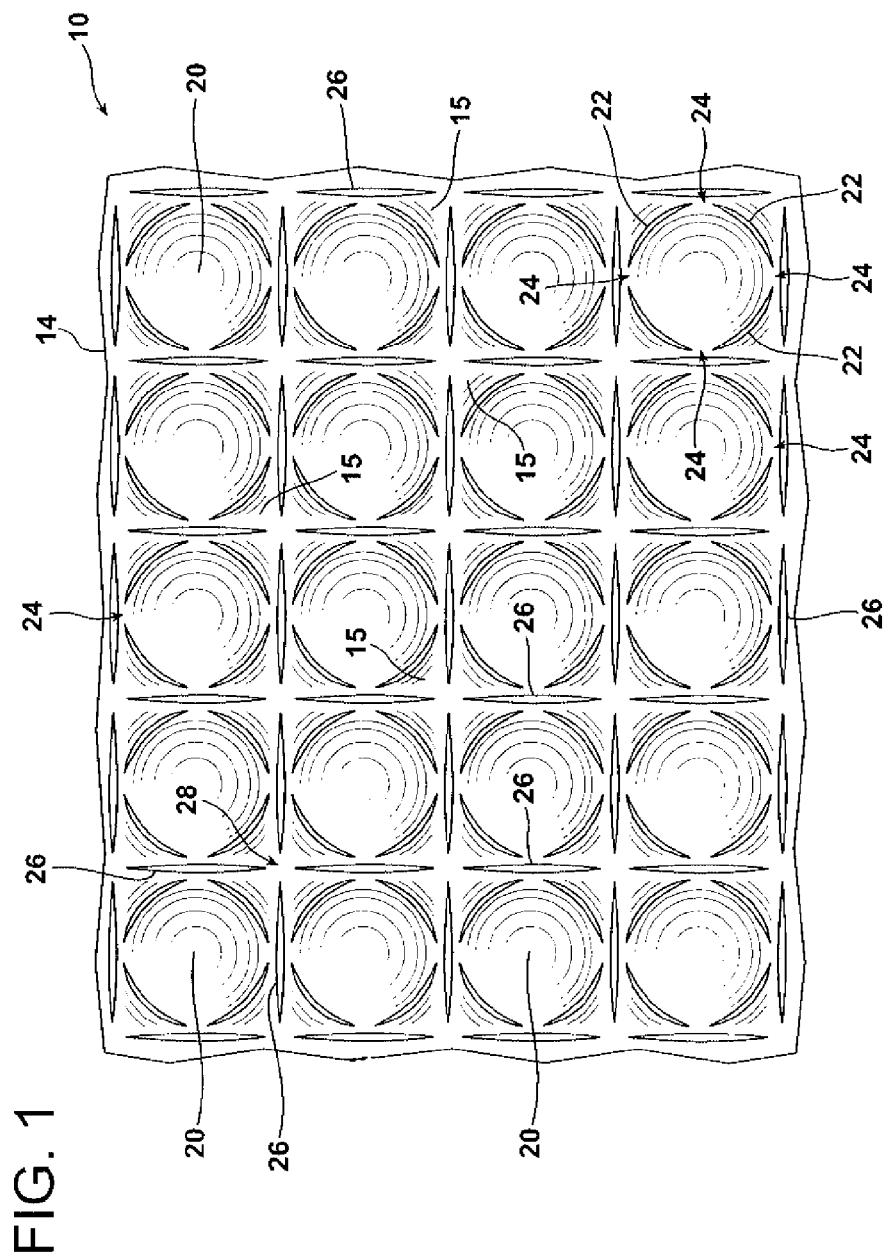
FIG. 1 is a perspective view of taken from a top side of a preferred embodiment of the cushioning article of the present invention.

As used herein, the phrase "cushioning article" refers to an article capable of reducing the impact of a product surrounded by the object.

As used herein, the term "sheet" also includes films, and refers to an object that is thin relative to its length and width. The sheet can have a thickness of from 1 mil (0.0254 mm) to 100 mils (2.54 mm) or from 1 mil (0.0254 mm) to 20 mils (0.508 mm) or from 1 mil (0.0254 mm) to 10 mils (0.254 mm) or from 1.5 mils (0.0381 mm) to 7 mils (0.177 mm) or from 2 mils (0.05 mm) to 5 mils (0.127 mm).

As used herein, the term "cut" and "slit" are used interchangeably, and refer to a slice though a sheet as can be made by a sharp object, as well as referring to a tear through the sheet. As used herein, the phrase "flap-cut sheet" refers to the sheet that has the flap-cuts in it. As used herein, the terms "flap" and "flap member" refer to an internal portion of a sheet that can be formed or bent or otherwise extended outwardly from the sheet. Discrete sets of intersecting straight cuts each provide multiple internal triangular-shaped portions of the sheet that can be bent outwardly. The triangular-shaped flaps are defined by the point of intersection of the cuts, the edges of the cuts, and the ends of the cuts. Two straight cuts that intersect at an angle of other than 90 degrees define four included angles that sum to 360 degrees, including two equal angles less than 90 degrees, and two equal angles greater than 90 degrees. As used herein, the phrase "lesser included angle" refers to either of the two angles less than 90 degrees.

As used herein, the phrase "set of flaps" refers to that plurality of flaps associated with a discrete set of intersecting cuts. Two intersecting cuts provide a set of four flaps; three intersecting cuts provide a set of six flaps; four intersecting cuts provide a set of eight flaps, etc.

All flaps defined by a discrete set of intersecting cuts can be extended outwardly from the sheet in the same direction, with a cap affixed to the top surface of the extending flaps, with a cap affixed to the bottom surface of the extending flaps, or with a first cap affixed to the top surfaces of the extending flaps and a second cap affixed to the bottom surfaces of the extending flaps. Alternatively, some of the flaps may be extended in a first direction with a remainder of the flaps extended in a direction opposite to the first direction. Caps can be affixed on one or both sets of extending flaps.

As used herein, the phrase "portion of the flap-cut sheet between the flaps" refers to that portion of the flap-cut sheet that is between the regions of the flap-cuts, as illustrated and described below.

As used herein, the phrase "a plurality of layers of at least one flap-cut sheet" is used with reference to at least two layers of flap-cut sheet over a product. The two layers can be two separate pieces of flap-cut sheet, or a single flap-cut sheet that is wrapped around the product more than once so that a plurality of layers of flap-cut sheet are built up over the product.

As used herein, the term "cap" and the phrase "cap member" refer to discrete members that are affixed to at least two outwardly extending flaps of a discrete set of flaps. While a set of flaps may have only one cap affixed thereto, more than one cap can be affixed to a single set of extending flaps. A cap can be affixed to the top surface of outwardly-extending flaps, or to the bottom surface of outwardly-extending flaps. Caps can be entirely separated from one another, or connected together in a common cap sheet, as illustrated and described below. The perimeter of the cap can be round, square, rectangular, triangular, pentagonal, hexagonal, heptagonal, octagonal, etc.

Caps can be small separate pieces that are not integral with a larger article and which are affixed individually to a plurality of extending flaps. Alternatively, a plurality of flaps can be integral with a "cap-cut sheet" (also referred to as a "capping sheet"), i.e., a sheet having a plurality of cuts in it that define a plurality of cap members integral with the sheet but extendible from the sheet but connect with the sheet through a small region integral with the sheet.

As used herein, the phrase "portion of the cap-cut sheet between the caps" refers to that portion of a cap-cut sheet that is between the regions of the cap-cuts, as illustrated and described below.

As used herein, the term "integral" is used with reference to the relationship between a small portion, such as a flap or a cap, cut into but not cut entirely apart from a larger whole, such as the remainder of the sheet. The flap or cap is integral with the sheet if the material from which the sheet is made (e.g., paper) is continuous from the remainder into the small portion, via at least one small continuous regions or several small continuous regions.

As used herein, the phrases "extending outwardly" and "outwardly extending" refer to taking on an orientation out of the remainder of the sheet. For example, flaps and caps can be bent or formed out of the main plane of the sheet they are integral with. "Extended outwardly" includes extended upwardly as well as extended downwardly.

As used herein, the term "composite dome" refers to the combination of at least two extending flaps affixed to a cap. The flaps can be affixed with an adhesive, such as corn starch or casein.

The surface of a composite dome can have a wide variety of shapes. One or more of several variations of rounded dome shapes can be utilized, such as circular spheroid, oblate spheroid, and prolate spheroid, polyhedral and polytopic. As used herein, the term "spheroid" refers to a quadric surface obtained by rotating an ellipse about one of its principal axes. If the ellipse is a circle, the result is a circular spheroid. If an ellipse is rotated about its minor axis, the result is an oblate spheroid, i.e., a flattened ellipsoid, e.g. the surface of a lentil. If an ellipse is rotated about its major axis, the result is a prolate spheroid, i.e., an elongated ellipsoid, e.g., the surface of rugby ball. Polyhedrons include conic surfaces and polytopic surfaces. Polytopic surfaces are surfaces of geometric objects with flat sides.

Figure 2:
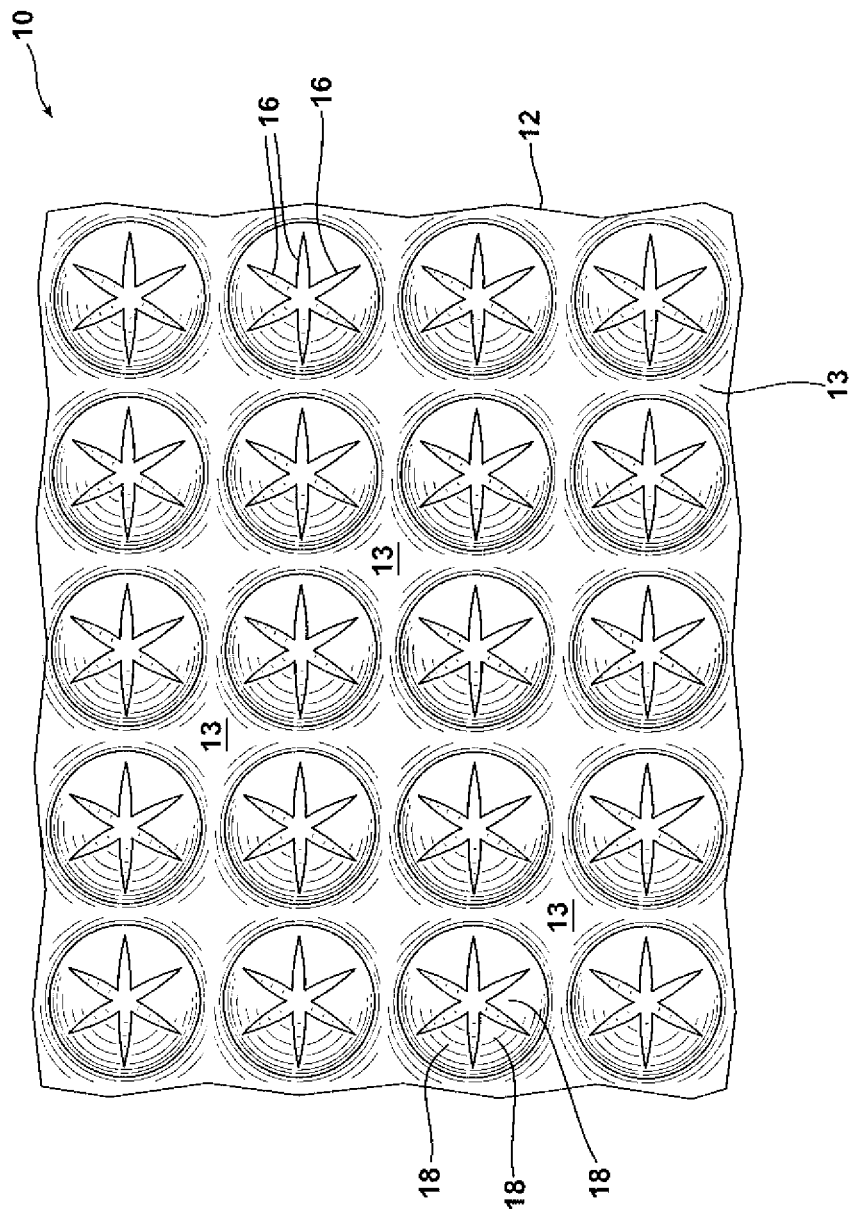
FIG. 2 is a perspective view of taken from the bottom side of the preferred embodiment of the cushioning article FIG. 1.

FIG. 1 and FIG. 2 together illustrate composite dome cushioning article 10. FIG. 1 illustrates the cushioning article 10 from a top side, i.e., with the composite domes oriented upward and out of the plane of the drawing. FIG. 2 illustrates the reverse side of the cushioning article of FIG. 1, i.e., with the composite domes oriented downward and out of the plane of the drawing. Cushioning article 10 is made by adhering flap-cut sheet 12 (see FIG. 2) to cap-cut sheet 14 (see FIG. 1). Flap-cut sheet 12 has a plurality of discrete sets of three intersecting flap-cuts 16 therein. Flap-cuts 16 have been spread open by the forming action in which flaps 18 are extended downwardly and out of the portion 13 of flap-cut sheet 12 between the discrete sets of flap-cuts (see FIG. 2), as well as up and above the portion 15 of cap-cut sheet 14 between the cap-cuts 22 (see FIG. 1). Each discrete set of three intersecting flap-cuts 16 provides a discrete set of six flap members 18 contiguous with flap-cut sheet 12.

In the embodiment of FIG. 1, formed composite domes include upwardly extending, formed convex caps 20 over top of and adhered to upwardly-extending flap members 18, not illustrated in FIG. 1 because they are beneath caps 20 of FIG. 1. Flaps 18 are illustrated in the view from the underside of cushioning article 10, i.e., the view of FIG. 2. Cap-cut sheet 14 has a plurality of discrete sets of four curved cap-cuts 22, which together extend around an individual formed cap 20. Each curved cap-cut 22 is separated from two adjacent cap-cuts 22 by uncut areas 24. In this manner, cap 20 remains integral with cap-cut sheet 14 via uncut areas 24. Moreover, each set of four cap-cuts 22 is surrounded by four straight cuts 26, with straight cuts 26 being arranged in a grid pattern. Straight cuts 26 stop short of intersecting one another at intersection areas 28, thereby maintaining the continuity of cap-cut sheet 14. Caps 20 remain attached to cap-cut sheet 14 as straight cuts 26 and cap-cuts 22 spread as the flaps 18 and caps 20 are formed (i.e., bent) so that they together extend upwardly and out of the plane of respective flap-cut sheet 12 and cap-cut sheet 14. Of course, the forming of caps 20 and flaps 18 also spreads flap-cuts 16 of flap-cut sheet 12, as illustrated in FIG. 2. From the top view illustrated in FIG. 1, each discrete cap forms an overall convex surface as a result of the forming process. From the bottom view illustrated in FIG. 2, each discrete set of flaps 18 forms a concave surface as a result of the forming process. Viewed from the perspective of FIG. 1, formed caps 20 and formed flaps 18 make up a formed composite dome providing a convex surface extending upward from both cap-cut sheet 14 and flap-cut sheet 12.

In FIG. 1 and FIG. 2, cap-cut sheet 14 is designed to provide discrete caps 20 as integral portions of cap-cut sheet 14. In this manner, the manufacture and handling of individual, separate caps becomes unnecessary. In contrast, the embodiment of FIG. 8, described below, utilizes individual, fully separated caps affixed over each discrete set of flaps, with the flaps and caps being formed together.

Figure 3:
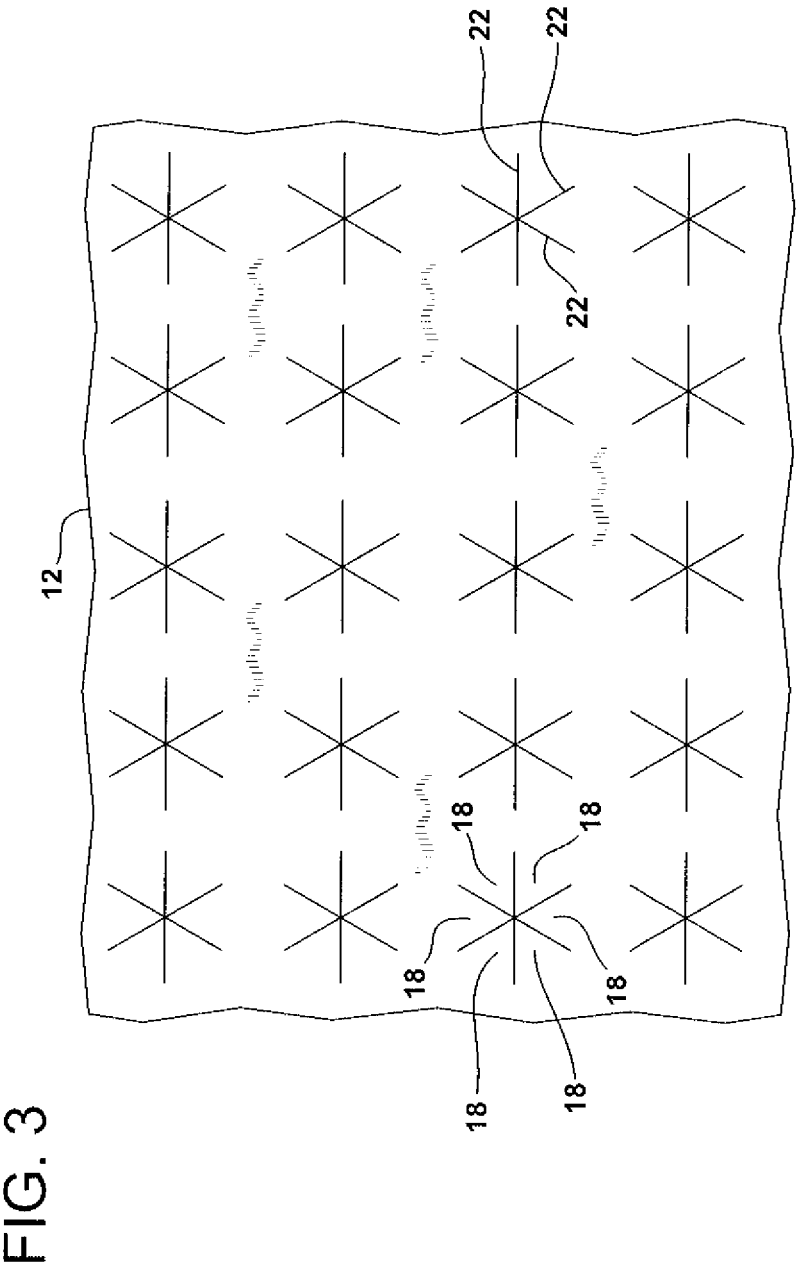
FIG. 3 is a perspective view of taken from a top side of an alternative preferred embodiment of the cushioning article of the present invention.
Figure 4:
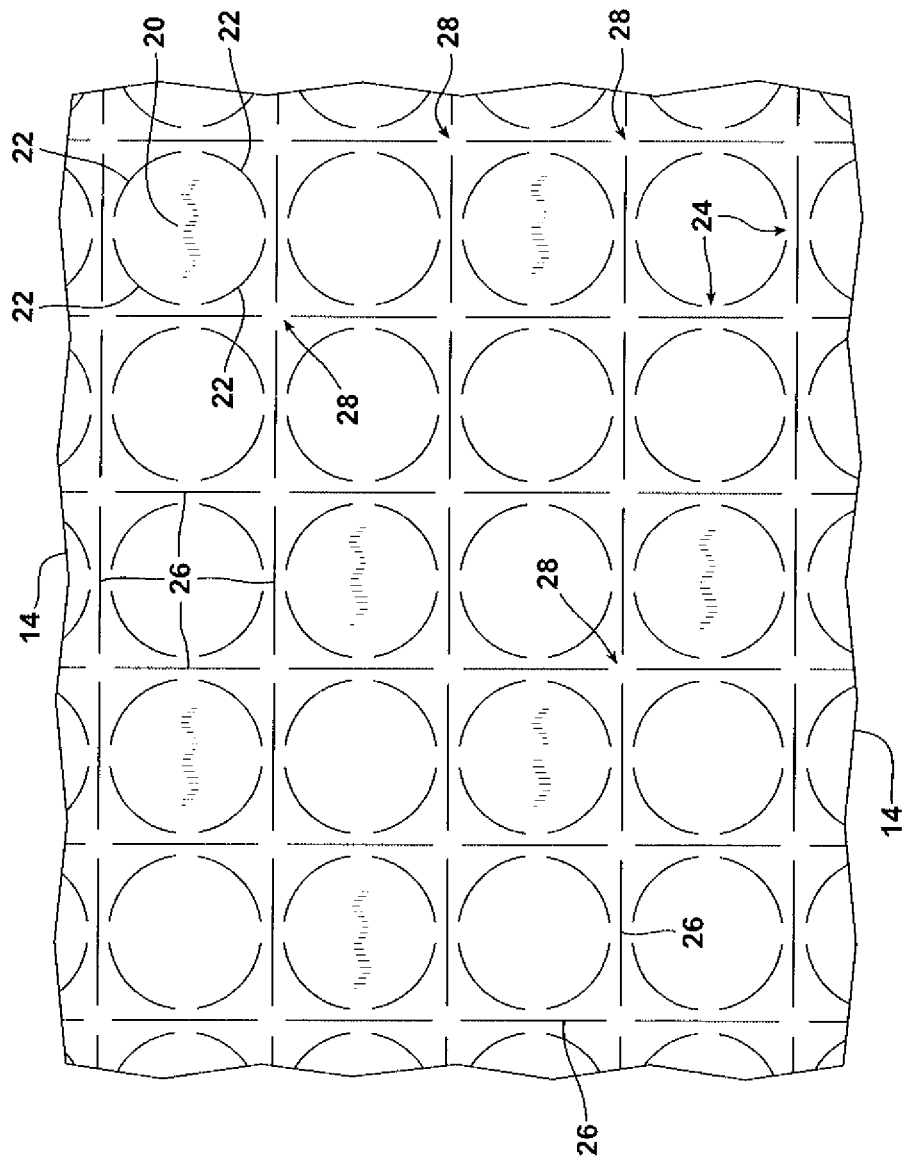
FIG. 4 is a perspective view of taken from the bottom side of the preferred embodiment of the cushioning article FIG. 3.

FIG. 3 illustrates flap-cut sheet 12 in its unformed state, before it is affixed to cap-cut sheet 14 of FIG. 4, and before the discrete sets of flaps are bent outwardly. Flap-cut sheet 12 has a plurality of discrete sets of three intersecting flap-cuts 22, with the three intersecting flap-cuts 22 together providing six unformed flap members 18 contiguous with flap-cut sheet 12. As illustrated in FIG. 3, each of the six unformed flap members 18 is in the plane of flap-cut sheet 12. Of course, flap members 18 are later bent upward and/or downward out of the plane of flap-cut sheet 12.

FIG. 4 illustrates cap-cut sheet 14 in its unformed state, before it is affixed to unformed flap-cut sheet 12 and before it is formed. Before forming, cap-cut sheet 14 has a plurality of discrete sets of four curved cap-cuts 22, each set extending around an individual unformed cap region 20. Each curved cap-cut 22 is separated from two adjacent cap-cuts 22 by uncut areas 24. Each set of four cap-cuts 22 is surrounded by four straight cuts 26, with straight cuts 26 arranged in a grid pattern, with straight cuts 26 stopping short of intersecting one another at intersection areas 28, thereby maintaining the integrity of cap-cut sheet 14.

Figure 5:
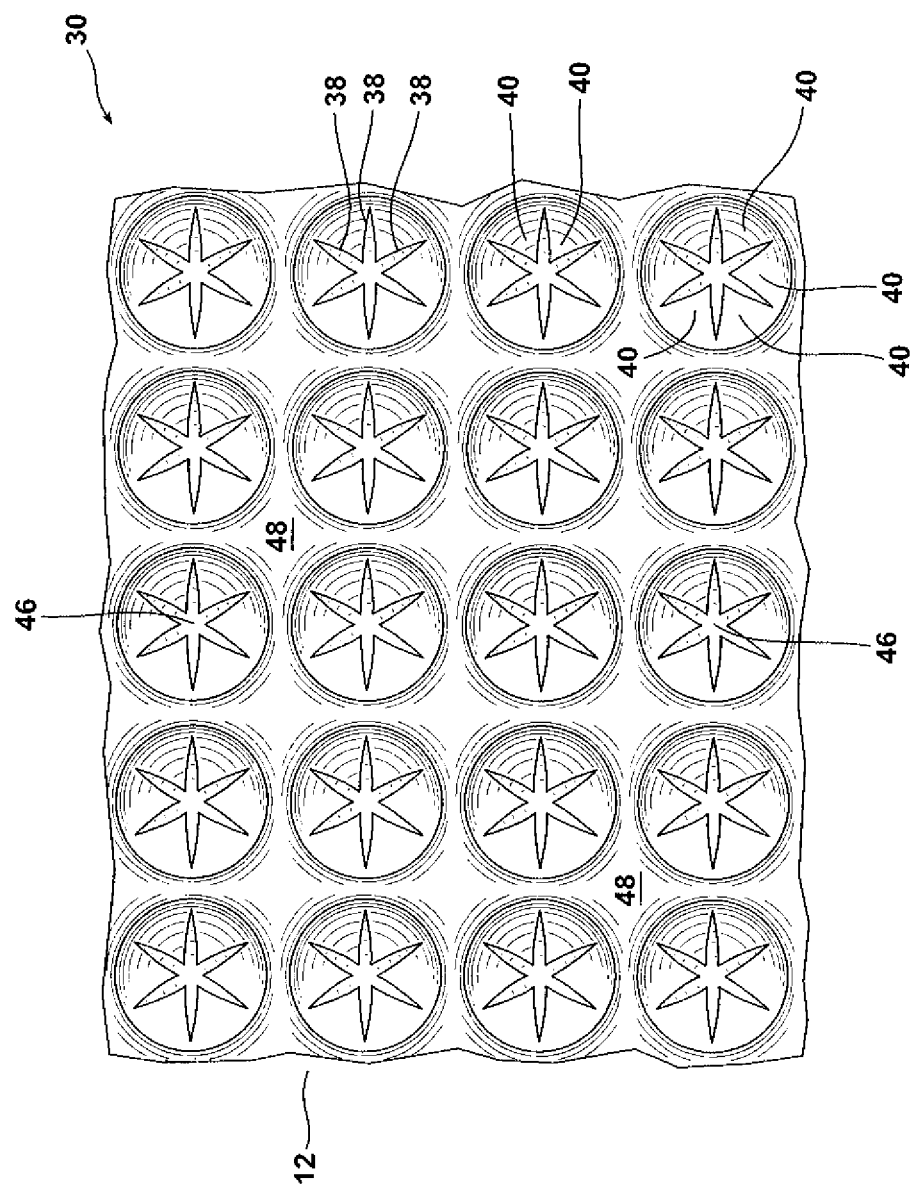
FIG. 5 is a schematic of a flat, i.e., unformed, flap-cut paper component present in the embodiments of FIGS. 1-4.
Figure 6:
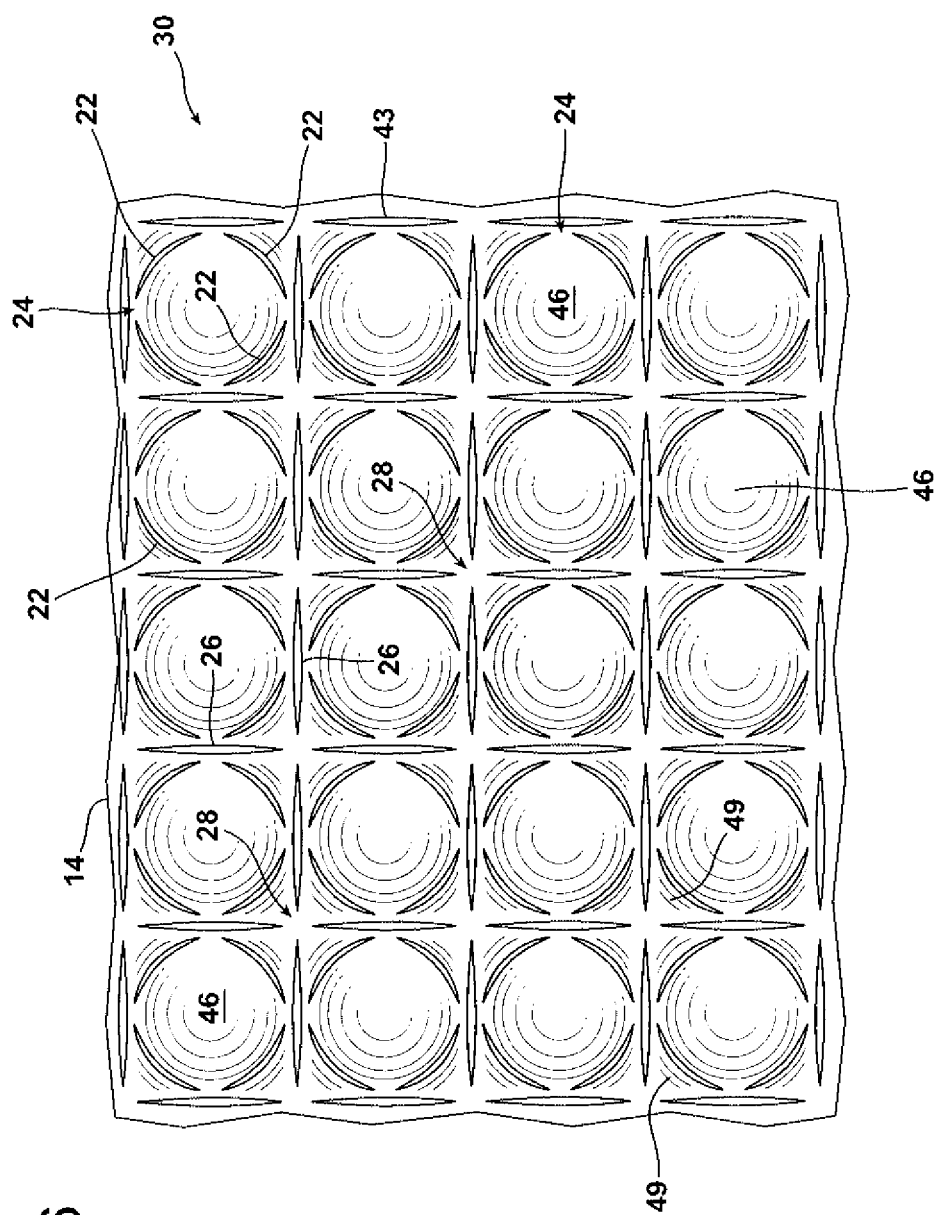
FIG. 6 is a schematic of a flat, i.e., unformed, cap-cut paper component present in the embodiments of FIGS. 1-4.

FIG. 5 and FIG. 6 together illustrate an alternative preferred cushioning article 30 which also utilizes the same flap-cut sheet 12 and cap-cut sheet 14 of FIGS. 3 and 4. However, in FIGS. 5 and 6, the forming is carried out in the opposite direction so that the formed caps 46, instead of being above the upwardly extending flaps 18 as in FIGS. 1 and 2, are beneath upwardly extending flaps 40 of FIG. 5.

FIG. 5 illustrates flap-cut sheet 12 with a plurality of discrete sets of six upwardly formed flaps 40 adhered over an upwardly formed supporting cap member 46. Each set of three intersecting straight cuts 38 provides six flap members 40 contiguous with flap-cut sheet 34. Each of the six flap members 40 is formed so that it protrudes outwardly from the plane of flap-cut sheet 12. In FIG. 5, upwardly extending cap members 46 are affixed to and support upwardly extending flap members 40, with "upwardly extending" referring to up and out of the plane of the drawing of FIG. 5, up and out of the plane of flap-cut sheet 12, i.e., up and out of the plane of the unformed area 48 between the discrete sets of intersecting flap-cuts 38 and flaps 40. Together, cap members 46 and flap members 40 form a plurality of composite domes that extend upward from the portion 48 of flap-cut sheet 12 that is between the discrete sets of flaps 40.

FIG. 6 illustrates the reverse side of the cushioning article of FIG. 5, i.e., with cap members 46 extending downward, below the plane of the drawing of FIG. 6, i.e., down and out of the plane of unformed areas 49 between the discrete sets of cap-cuts 42 and caps 46. In FIG. 6, cap-cut sheet 14 has a plurality of discrete sets of four curved cap-cuts 22, which together extend around an individual formed supporting cap 46. Each curved cap-cut 22 is separated from two adjacent curved cap-cuts 22 by uncut areas 24. Moreover, each set of four cap-cuts 22 is surrounded by four straight-cuts 43, with straight cuts 43 arranged in a grid pattern, with straight-cuts 26 stopping short of intersecting one another at intersection areas 28. Straight-cuts 26 and cap-cuts 22 allow supporting caps 46 to remain attached to cap-cut sheet 14 as straight-cuts 43 and cap-cuts 22 spread as flaps 40 and supporting caps 46 are formed. Of course, the forming of supporting caps 46 also spreads flap-cuts 38 in flap-cut sheet 12 (see FIG. 5).

Figure 7:
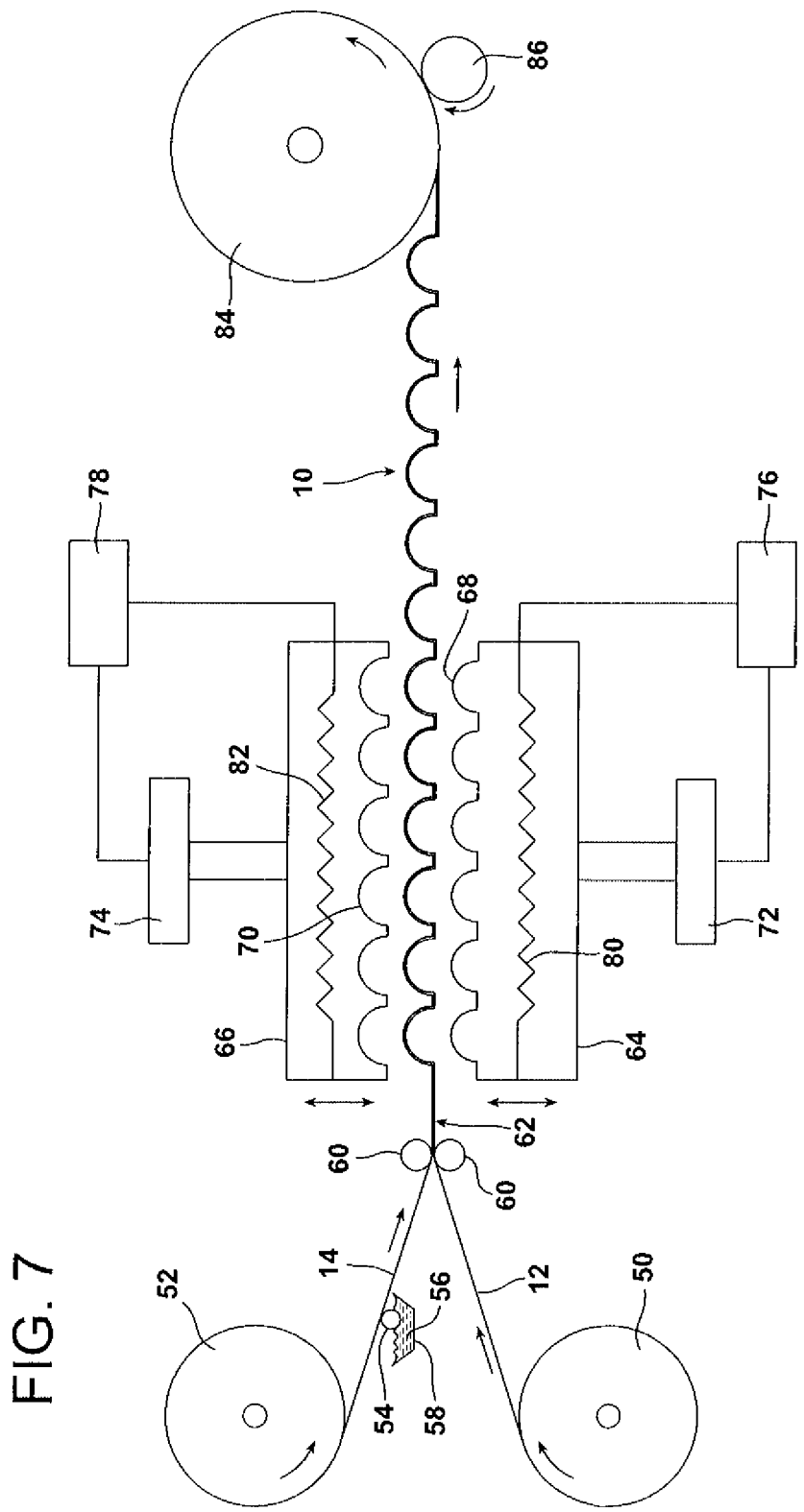
FIG. 7 is a schematic of a process for making the cushioning article of FIGS. 1-4 using the components of FIGS. 5 and 6.

FIG. 7 illustrates a schematic process for making the composite domes cushioning article 10 of FIG. 1 and FIG. 2. In FIG. 7, a strand of flap-cut sheet 12 (i.e., pre-cut and rolled up) is unrolled from roll 50, while a strand of cap-cut sheet 14 (i.e., pre-cut and rolled up) is simultaneously unrolled from roll 52. Flap-cut sheet 12 has been prepared using cutting dies to make discrete sets of flap-cuts 16 (see FIG. 2), and cap-cut sheet 14 has been prepared using cutting dies to make discrete sets of cap-cuts 22 and straight cuts 26 (see FIG. 1). Before flap-cut sheet 12 contacts cap-cut sheet 14, roller 54 immersed in adhesive 56 held in tray 58 applies a layer of adhesive 56 to the surface of cap-cut sheet 14 that is to contact flap-cut sheet 12. In this manner, a layer of adhesive 56 is between cap-cut sheet 14 and flap-cut sheet 12 as sheets 14 and 12 contact one another as they pass through nip rollers 60. The centers of the discrete sets of cap-cuts in cap-cut sheet 14 are indexed so that they are located over the centers of the discrete sets of flap-cuts in flap-cut sheet 12, using manual or automatic indexing means, not illustrated. Unformed composite 62 emerges from nip rollers 60, and is thereafter forwarded through a set of forming dies including male die 64 and female die 66. Male die 64 has a set of dome-shaped protrusions 68 that fit into a mating set of reverse-dome cavities 70 of female die 66.

Dies 64 and 66 oscillate up and down as per the arrows shown in FIG. 7, with composite 62 being intermittently forwarded through dies 64 and 66. The forming of composite 62 takes place through the use of heat and pressure. Optionally, steam can be added to soften the sheets to enhance the forming process, or as a substitute for the heating of dies 64 and 66. The oscillating movements of male die 64 and female die 66 are carried out by presses 72 and 74, respectively, each of which is capable of moving its respective die towards and away from the other die, as per the arrows showing the movement of the dies. Alternatively, one press can be used to move one die back and forth while the other die is in a fixed position. Presses 72 and 74 are powered by power sources 76 and 78, respectively. Dies 64 and 66 can optionally be heated, for example by internal resistance wires 80 and 82, respectively, with resistance wires 80 and 82 also being powered by power sources 76 and 78, respectively.

The pressure and heat applied from heated dies 64 and 66 produces cushioning article 10. The heat from heated dies 64 and 66 can harden and cure adhesive 56 between flap-cut sheet 12 and cap-cut sheet 14 to produce cushioning article 10, which after emergence from heated dies 64 and 66 is wound onto roll 84 which can be rotated via powered roller 86 or other appropriate means.

Figure 8:
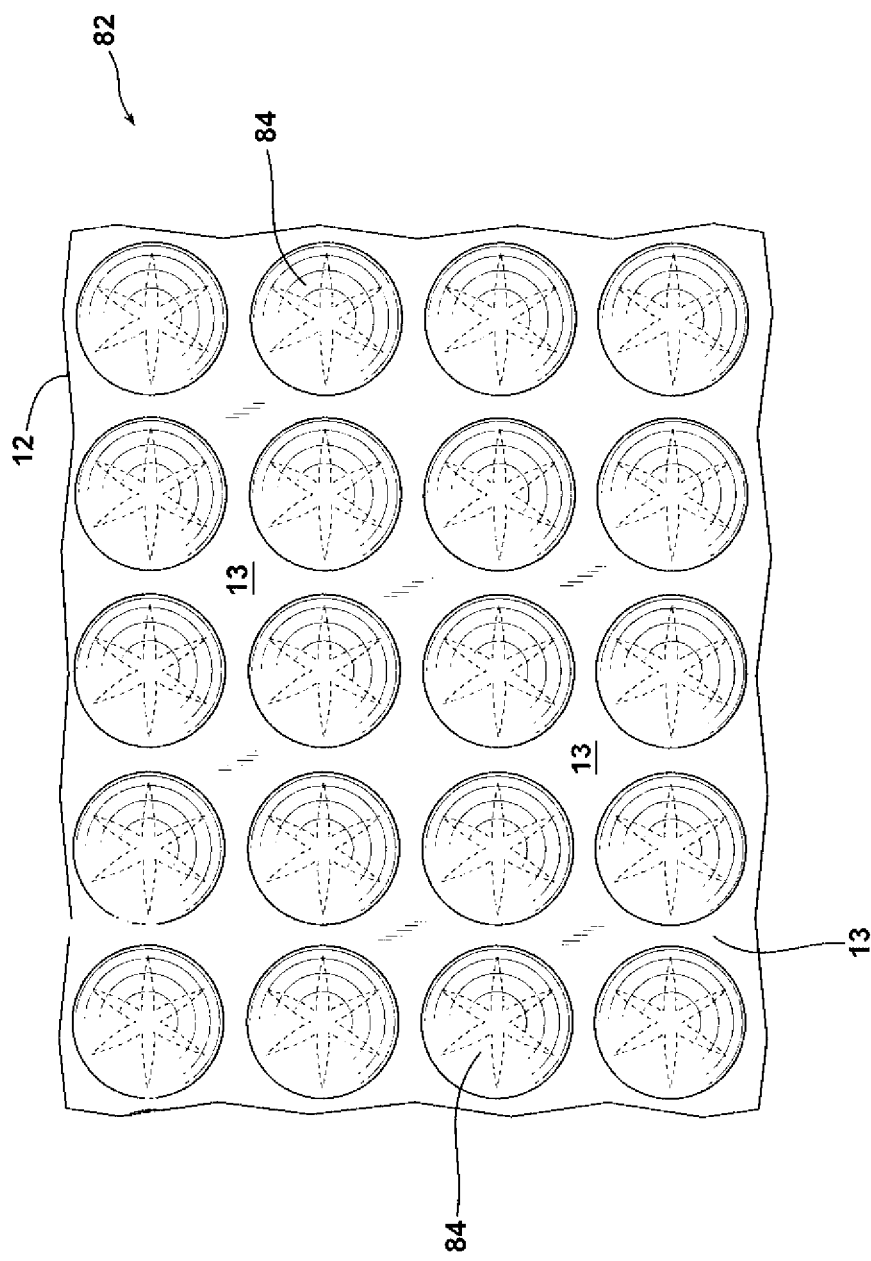
FIG. 8 is a perspective view taken from a top side of an alternative preferred embodiment of the cushioning article of the present invention.

FIG. 8 represents an alternative cushioning article 82 in which upwardly-extending, formed cap members 84 are individual cap members that are not integral with a sheet having a plurality of cap members. Rather, formed cap members 84 are separate, caps members 84 individually adhered to flap-cut sheet 12. Flap-cut sheet 12 has a plurality of discrete sets of upwardly extending flaps, illustrated in dotted lines because they are below cap members 84. Both caps 84 and the flaps below caps 84 are formed so that they extend upwardly from the unformed portion 13 of flap-cut sheet 12, with the formed flaps being oriented upward from flap-cut sheet 12. Just as in FIG. 1 through FIG. 6, cushioning article 82 comprises flap-cut base sheet 12 having a plurality of discrete sets of three intersecting straight cuts with each set of three intersecting straight cuts producing a discrete set of six flaps which have been formed upward and out of the plane the unformed portion 13 of flap-cut sheet 12. The embodiment of FIG. 8 is less preferred than the embodiments of FIGS. 1 and 2 and FIGS. 5 and 6 to the extent that each cap member 84 must be individually affixed over a discrete set of flaps, as the individual cap members 84 are not contiguous with a cap-cut sheet.

Example 1

A Paper-Based Cushioning Article

A paper-based cushioning article was produced using the process illustrated in FIG. 7, described above. The resulting cushioning article was as illustrated in FIG. 1 and FIG. 2, described above, with the composite domes having cap members adhered on top of the upwardly extending flap members.

The cap-cut sheet was cut in a pattern in accordance with the pattern of the cap-cut sheet of FIG. 4, described above. The paper used in the cap-cut sheet was a kraft paper obtained from Uline, of Chicago, Ill. The kraft paper had a thickness of 0.0035 inch. Each discrete set of four individual cap-cuts was made using a radius of curvature of about ⅜ inch (i.e., 9.5 millimeters), i.e., providing the cap with a diameter of about ¾ inch (19 mm). The ends points of individual cap-cuts were spaced from the ends of the two adjacent cap-cuts of the same set by a distance of about 3/32 inch (2.4 mm). The center of each discrete set of cap-cuts, i.e., the center of the cap, was located 1 inch (25.4 mm) from the centers the four closest adjacent caps. Each of the four straight cuts surrounding any given cap was spaced ½ inch (12.7 mm) from the center of the cap. The ends of the straight cuts were separated by a distance of about ⅛ inch (3.2 mm) from the end of the adjacent straight cut continuing along the same line.

The flap-cut sheet was cut in a pattern in accordance with the pattern of the flap-cut sheet of FIG. 3, described above. The paper used in the flap-cut sheet was the same kraft paper used for the cap-cut sheet, described above. Each flap-cut in each discrete set of three intersecting flap-cuts had a length of ¾ inch (19 mm). As illustrated in FIG. 3, each of the three flap-cuts in each set intersected each of the other two flap-cuts at a lesser included angle of 60 degrees, resulting in each set of flap-cuts having six triangular flaps of equal size. The discrete sets of flap-cuts were arranged on the flap-cut sheet so that the centers of adjacent sets of flap-cuts were 1 inch (25.4 mm) apart, with each set of flap-cuts having four nearest adjacent sets of flap-cuts. In this manner, the centers of the flap-cuts of the flap-cut sheet corresponded with the centers of the cap-cuts of the cap-cut sheet.

The cushioning article was made by aligning the centers of the discrete sets of flap-cuts of the flap-cut sheet with the centers of the caps of the cap-cut sheet, and a corn starch adhesive, such as Argo corn starch of AGH Food Companies, Inc. of Oakbrook, Ill., was applied between the cap-cut sheet and the flap-cut sheet. The adhesive was applied in an amount resulting in an adhesive thickness of about 0.002 inch upon drying.

Once the cap-cut sheet contacted the flap-cut sheet with centers of the sets of flap-cuts aligned with the centers of the sets of cap-cuts, with the adhesive between the flap-cut sheet and the cap-cut sheet, the resulting composite was run through a forming apparatus so that the flaps and caps were formed (i.e., bent) to make composite domes. The forming apparatus included a male die and a female die. The unformed composite was placed between the male die and the female die with the centers of the discrete sets of flap-cuts aligned with the centers of the discrete sets of cap-cuts, with the centers of the sets of flap-cuts and cap-cuts aligned with the centers of the dome-shaped protrusions of the male die. The male die had a set of dome-shaped protrusions having a base diameter of ¾ inch (19 mm) and a height of ⅜ inch (9.5 mm). The female die was made from silicone rubber in order to avoid the need to align the upper and lower forming dies. A pressure of about 2 lb/in² was applied to the composite in order to make the flaps and caps extend upwardly out of the plane of the remainder of their respective sheets. The male die was heated to a temperature of 400° F. to speed the glue drying. The pressure was applied for a period of about 4 seconds, although around 1-2 seconds would have been adequate.

The resulting upwardly extending composite domes had a base diameter of approximately ¾ inch (19 mm), i.e., approximately the same as the diameter of the cap-cuts and the length of the flap-cuts. Each composite dome had a height of about 5/16 inch (about 8 mm). i.e., from the bottom surface of the unformed portion of the flap-cut sheet to the top surface of the formed dome-cut sheet. The diameter of the composite domes, being 19 millimeters, was more than twice the 8 millimeter height of the composite domes. As such, the convex surface of the domes was somewhat flatter than half of a circular spheroid. That is, the convex surface of the domes was an oblate spheroid surface, i.e., a somewhat flattened ellipsoid.

Example 2

Cushioning Performance of Example Vs. Comparatives

Figure 9:
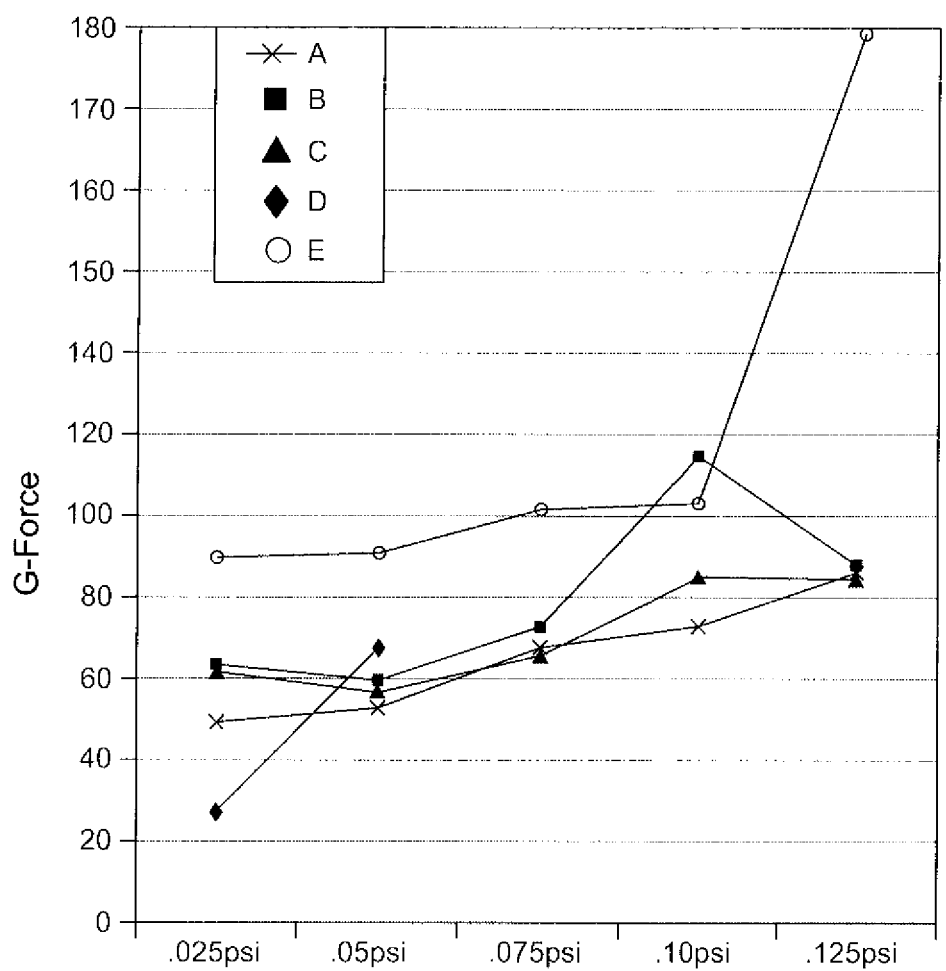
FIG. 9 is a plot of acceleration (G-Force) vs. payload load (psi) for various cushioning products.

FIG. 9 is a chart showing a plot of G-Force (i.e., acceleration) versus payload pressure (psi) for several different cushioning products labeled A, B, C, D, and E. Sample A, the first sample tested, was the paper-based cushioning article of Example 1 above. At 1.3 lb/ft³, Sample A had the lowest density of any of the paper-based cushioning articles tested.

Sample B was a plastic-based thermoformed air cellular cushioning of a type similar to Bubble Wrap® air cellular cushioning. The diameter of the cells was about ⅜ inch (9.8 mm) and the height of the cells was about ⅛ inch (3.2 mm), and the percent of the bubble land area on the sheet was about 70 percent. The density of the air cellular cushioning was not measured.

Sample C was Greenwrap®, obtained from Geami, and was made from two sheets of paper. The first sheet was a white sheet made from 100% recycled paper, and had a thickness of 0.015 inch. The second sheet was made from Kraft paper having a thickness of 0.004 inch, slit and expanded to form a hexagonal pattern. The Geami paper product was tested and determined to have a density of 1.5 lb/ft³.

Sample D was a paper-based cushioning product obtained from Ranpak. Sample D was a paper-based product made from Kraft paper that was folded in a machine to make the cushioning material. Although different paper thicknesses can be used in the machine to make different cushioning materials, Sample D was made from paper having a thickness of 0.004 inch. Sample D was tested and determined to have a density of 3.0 pounds per cubic foot.

Sample E was a paper-based product made in accordance with U.S. Pat. No. 2,502,112. Sample E was made using two sheets of kraft paper, each having a thickness of 0.0035 inch. The paper was "indented" to produce a pattern having a measured thickness of 0.020 inch. The paper was modified by cutting and folding triangular patterns to prevent the indentations from nesting. Sample E had a density of 10 lb/ft³.

An additional sample, not illustrated in FIG. 9 but herein referred to as Sample F, was made and tested for cushioning performance. This sample was made in accordance with U.S. Pat. No. 494,923. The sample was made from two sheets of 0.0035 inch thick kraft paper. The two sheets were separated and attached by folding tabs. The paper thickness and folding tabs were selected to be the same as the composite domes of Example 1. The density of the sample was 0.90 pounds per cubic foot. Sample F exhibited no cushioning performance, as it bottomed out at the lightest loading tested.

As is apparent from FIG. 9, the acceleration of the A sample was consistently lower than the acceleration of the E sample (the indented paper product of U.S. Pat. No. 2,502, 112). The acceleration performance of the A sample was as good as or better than the acceleration performance of the B sample, and was similar to the acceleration performance of the C sample. The D sample had an acceleration performance superior to the A sample at the lowest loading tested (0.025 psi), but was somewhat inferior to the A sample at the next highest loading of 0.05 psi. At loadings higher than 0.05 psi, the D sample bottomed out at the loadings tested, i.e., it exhibited no cushioning performance at a loading of 0.075 psi and above. Table 1, below, includes the data plotted in FIG. 9 for each of samples A, B, C, D and E, as well as the calculated average G-force over the load tested range, sample density, and the calculated product of the average G-force and density.

TABLE 1

| Sample | g-force @0.025 psi | g-force @0.05 psi | g-force @0.075 psi | g-force @0.10 psi | g-force @0.125 psi | accel: average g-force (psi) | Sample Density (lb/ft³) | Product of avg. g-force & density |
| --- | --- | --- | --- | --- | --- | --- | --- | --- |
| A | 48.7 | 52.7 | 67.3 | 73.3 | 86.7 | 65.14 | 1.3 | 86.1 |
| B | 62.7 | 59.3 | 72 | 114.7 | 88 | 79.34 | — | — |
| C | 61.3 | 56.7 | 65.3 | 85.3 | 84.9 | 70.7 | 1.5 | 106.05 |
| D | 27 | 67.5 | — | — | — | 47.25 | 3.0 | 141.75 |
| E | 89 | 91 | 101 | 103 | 179 | 112.6 | 10 | 1126 |

As is apparent from FIG. 9, Sample A had the lowest acceleration of any of the samples tested over the entire loading range of 0.025 psi to 0.125 psi. Only Sample D had a lower acceleration than Sample A, and even then, only at the lowest loading level.

The product of sample density and average G-force provides a numerical indication of the efficiency of a cushioning article. The lower the product of the sample density and the average g-force over the tested load range tested, the more efficient the cushioning article, in terms of achieving high cushioning value for low mass of cushioning material. As is apparent from Table 1, the product of average G-force and product density of Sample A was 86.1, which was significantly lower than the product of average G-force and density for the remaining paper-based samples C, D, and E.

Example 3

Boxed Cold Packs

Insulation Performance of Composite Dome Sheet of Example 1 Vs. Polystyrene Foam It has been discovered that multiple layers of the paper-based cushioning article described in Example 1 above (i.e., Sample A), when provided with an unformed additional sheet of brown kraft paper between each of the multiple layers of the domed cushioning article, provides a degree of thermal insulation superior to a polystyrene foam box having the same insulation volume.

A Uline Cold Pack containing 6 ounces of a frozen gel in a plastic package, having dimensions of about 6 inches long, about 4 inches wide, and about ½ inch thick, was placed into an inner corrugate shipping box 8 inches (203 mm) long, 6 inches (152 mm) wide, and 5 inches (127 mm) tall. The frozen gel pack was at a temperature of about −8° C. when placed into the inner box. The frozen gel pack had a temperature sensor attached thereto, the sensor having a wire lead that passed through an opening out of the inner box. The inner box was closed and 1.5 inches of insulation was placed around all sides of the inner box, i.e., between the inner box and an outer corrugate shipping box having inside dimensions of 11 inches (279 mm) long, 9 inches (229 mm) wide, and 8 inches (203 mm) tall. The insulation was composed of four layers of the domed cushioning article of Example 1. Both the flap-cut sheet and the cap-cut sheet were made from white kraft paper which was 0.0035 inch (0.09 mm) thick. Between each of the four sheets of composite dome cushioning article was a sheet of brown kraft paper also 0.0035 inch (0.09 mm) thick. The inner box was closed and the 1.5 inches (38 mm) of cushioning/insulation was provided around each of the six faces of the inner box, i.e., between the inner box and the outer box. The outer box was then closed, and the rise in temperature of the gel pack was recorded as function of time.

At the same time that the above test was run, a comparative test was run using another Uline Cold Pack containing 6 ounces of a frozen gel in a plastic package, having dimensions of about 6 inches (152 mm) long, about 4 inches (102 mm) wide, and about ¼ inch (12.7 mm) thick, was placed into a lidded polystyrene foam inner shipping box having inside dimensions of 8 inches (203 mm) long, 6 inches (152 mm) wide, and 5 inches (127 mm) tall. The frozen gel pack was at a temperature of about −8° C. when placed into the inner box. The frozen gel pack had a temperature sensor attached thereto, the sensor having a wire lead that passed through an opening out of the polystyrene foam inner box. The thickness of the walls, bottom, and top lid of the polystyrene foam inner box was 1.5 inches (38 mm), i.e., the polystyrene foam inner box had outer dimensions of 11 inches (279 mm) long, 9 inches (229 mm) wide, and 8 inches (203 mm) high. The polystyrene foam served as the insulation. The outer box was then closed, and the rise in temperature of the gel pack was recorded as function of time. Ambient temperature was monitored during the period that the temperature of both gel packs was monitored.

Figure 10:
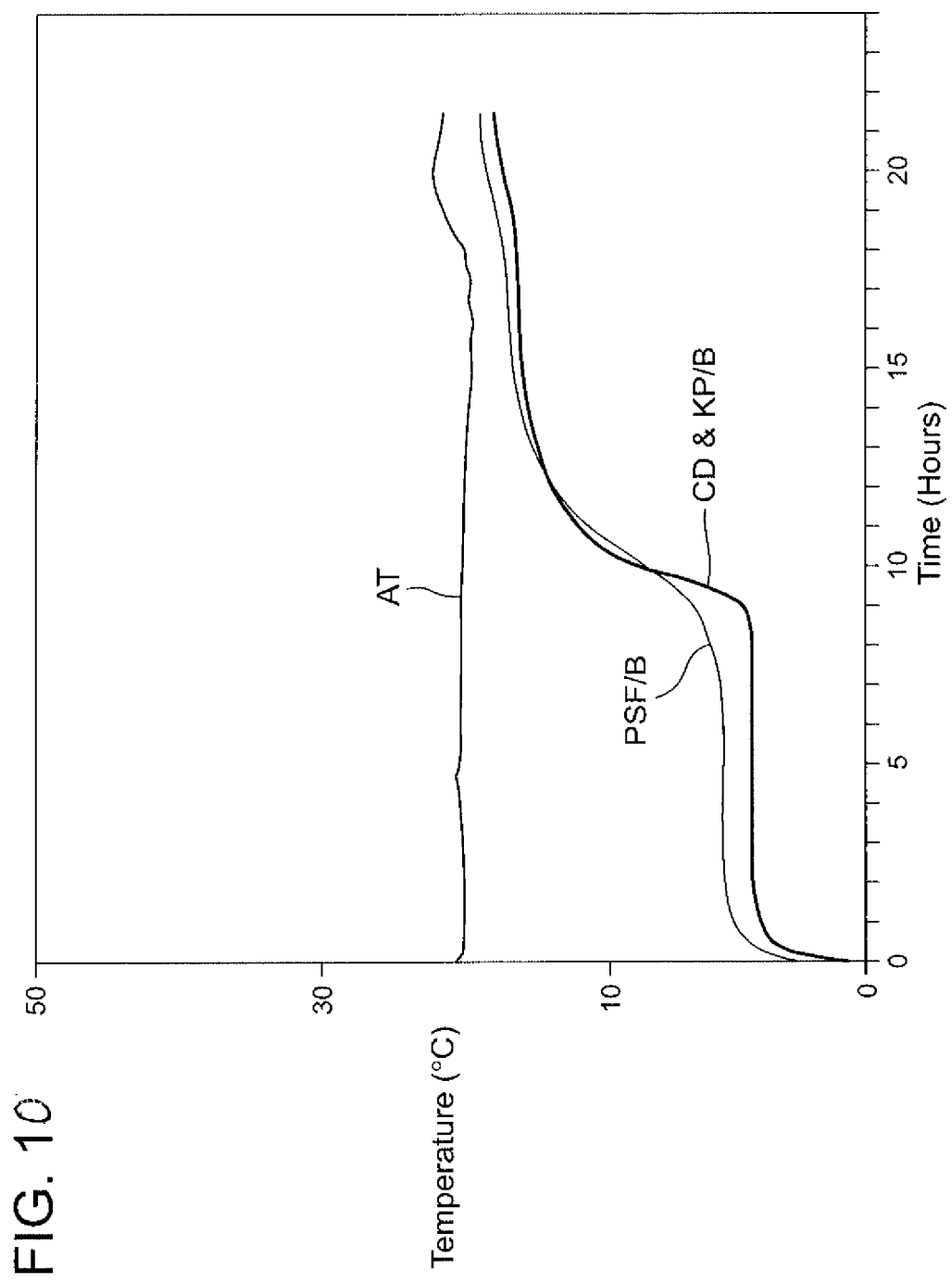
FIG. 10 is a plot of temperature (° C.) vs. time (hours) showing the rise in temperature of a gel pack packaged in a polystyrene foam box versus packaged in a corrugated paper box surrounded by insulation made from a plurality of paper-based sheets having composite domes with brown kraft paper between the domed sheets.

FIG. 10 provides the results of the cold pack testing of Example 2. In FIG. 10, curve "AT" represents the ambient temperature during the testing. Curve "PSF/B" represents the temperature of the gel pack packaged in the box of polystyrene foam. Curve "CD&KP/B" represents the temperature of the gel pack in the corrugated paper box surrounded by 1.5 inches (38 mm) thickness of a plurality of sheets of the paper-based composite dome article of Example 1, with brown kraft paper sheets between the sheets having composite domes.

As can be seen in FIG. 10, the paper-based cushioning/insulating article provided greater insulation than the box of polystyrene foam from the moment at which the boxes were closed until about 10 hours later, at which time the packages were at about the same temperature. Thereafter, from about 10 hours to about 22 hours, the temperatures of the gel packs were similar. Although the "PSF/B" sample had a recorded temperature of about 2° C. to 3° C. for the time period of from 2 hours to 8 hours, it should have recorded 0° C. during this period. It is believed that the recorded temperature was 2° C. to 3° C. higher than the temperature of the gel pack because the sensor was not taped as securely to the cold pack as the sensor for the "CD&KP/B sample.

Example 4

Boxed vs. Wrapped Cold Packs

Insulation Performance of Wrapped Example Vs. Boxed Polystyrene Foam

It has also been discovered that by wrapping a frozen gel pack in multiple layers of the cushioning and insulation article used in Example 3 above (i.e., Sample A, made with two sheets of white craft paper), when provided with an unformed additional sheet of brown kraft paper between each of the multiple layers of the domed cushioning article, provides a degree of thermal insulation superior to the paper-based insulated box of Example 3, and well as superior to the polystyrene-based box of Example 3.

A Uline Cold Pack containing 6 ounces of a frozen gel in a plastic package, having dimensions of about 6 inches (152 mm) long, about 4 inches (102 mm) wide, and about ½ inch (12.7 mm) thick, and having a temperature sensor attached thereto, was wrapped with the paper-based cushioning/insulation article of Example 1. Enough of the paper-based article was used to ensure that the frozen gel pack was surrounded by a thickness of 1.5 inches of the paper-based cushioning/insulation article. The resulting wrapped article had a length of 9 inches (229 mm), a width of 7 inches (178 mm), and a thickness of 3.5 inches (89 mm). Both the flap-cut sheet and the dome-cut sheet were made from white kraft paper which was 0.0035 inch (0.09 mm) thick. Between each of four wrapped layers of composite dome cushioning article wrapped around the cold pack was a similarly wrapped sheet of brown kraft paper also 0.0035 inch (0.09 mm) thick. The rising temperature of the gel pack was recorded as function of time.

At the same time that the above test was run, a comparative test was run using another Uline Cold Pack containing 6 ounces of a frozen gel in a plastic package, having dimensions of about 6 inches (152 mm) long, about 4 inches (102 mm) wide, and about ½ inch (12.7 mm) thick. Again, the gel pack with attached temperature sensor was placed into a lidded polystyrene foam inner shipping box having inside dimensions of 8 inches (203 mm) long, 6 inches (152 mm) wide, and 5 inches (127 mm) tall. The frozen gel pack was at a temperature of about −8° C. when placed into the polystyrene box. The lead wire from the temperature sensor was passed through an opening out of the polystyrene foam box. The thickness of the walls, bottom, and top lid of the polystyrene foam box was 1.5 inches (27 mm), i.e., the polystyrene foam inner box had outer dimensions of 11 inches (279 mm) long, 9 inches (229 mm) wide, and 8 inches (203 mm) high. The polystyrene foam served as the insulation. The box was then closed, and the rise in temperature of the gel pack was monitored and recorded as function of time. Ambient temperature was also monitored during the period that the temperature of both gel packs was monitored.

Figure 11:
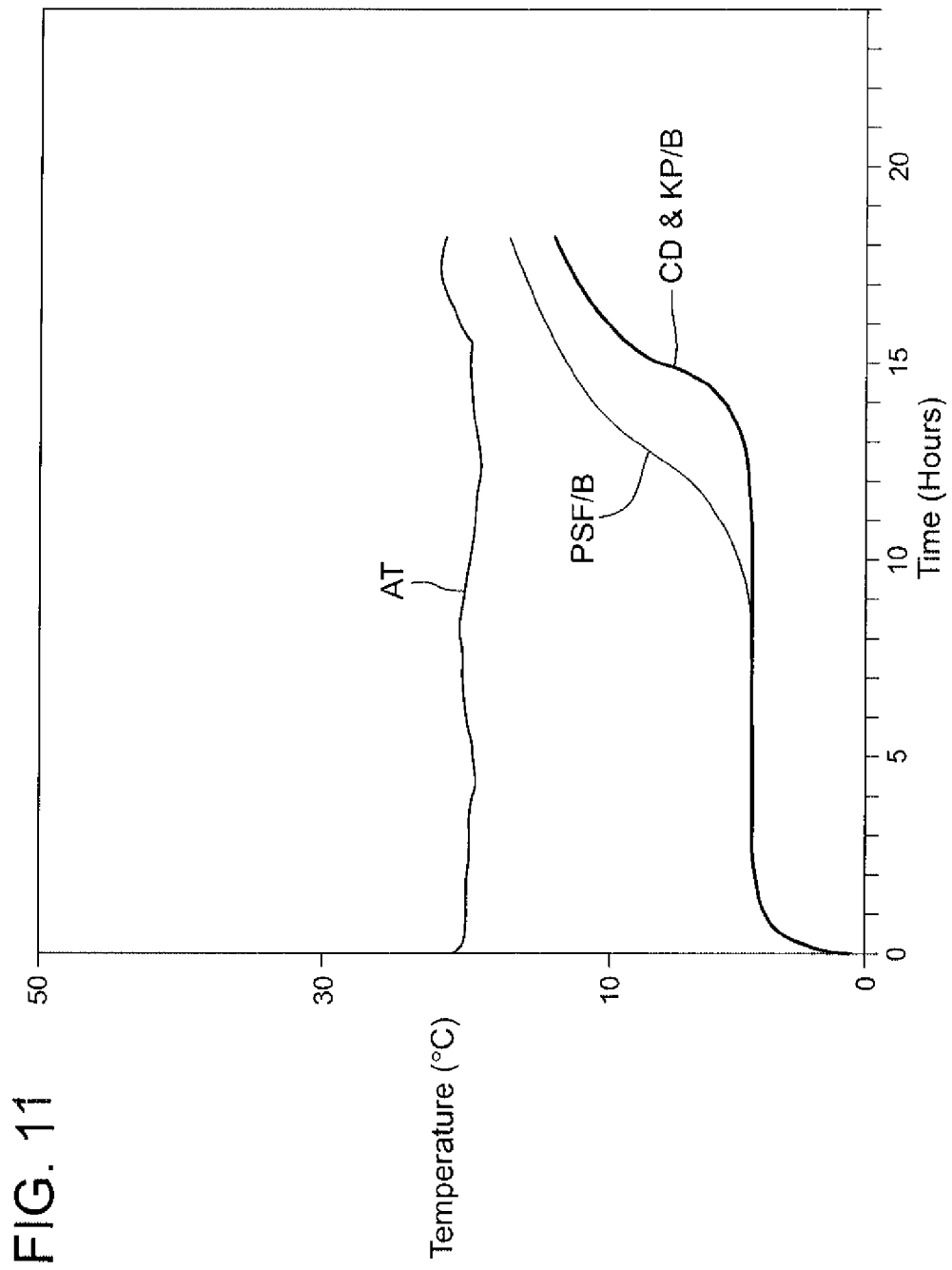
FIG. 11 is a plot of temperature (° C.) vs. time (hours) showing the rise in temperature of a gel pack packaged in a polystyrene foam box versus a gel pack wrapped in insulation made from a plurality of paper-based sheets having composite domes with brown kraft paper between the domed sheets.

FIG. 11 provides the results of the cold pack testing of Example 4, i.e., both the cold-pack wrapped with the composite dome sheet paper-based cushioning/insulation article of Example 1 and the cold pack in the polystyrene foam box. In FIG. 11, the curve labeled "AT" represents the ambient temperature during the test period. Curve "PSF/B" represents the temperature of the gel pack packaged in the box of polystyrene foam. Curve "CD&KP/W" represents the temperature of the gel pack wrapped in 1.5 inches (38 mm) thickness of a plurality of layers of the paper-based composite dome article of Example 1, with the brown kraft paper sheets between the while cap-cut and flap-cut sheets formed into the composite domes.

As can be seen in FIG. 11, the paper-based cushioning/insulating article provided greater insulation than the box of polystyrene foam from the moment at which the boxes were closed until the conclusion of the test, which was 18 hours after the test was initiated. As can be seen from FIG. 11, the cold pack wrapped with the paper-based cushioning/insulating article remained at about 0° C. for about 3 hours longer than the gel pack in the polystyrene foam box. A comparison of FIG. 11 with FIG. 10 shows that the gel pack was maintained at a lower temperature for about three hours longer when it was wrapped with layers of the paper-based composite dome cushioning/insulation article with kraft paper between layers, versus placed in a box and surrounded by the paper-based composite dome cushioning/insulation article with kraft paper between the layers. More particularly, in the CD&KP/B curve of FIG. 10, the cold pack reached 10° C. at about 10.5 hours, whereas the CD&KP/W curve of FIG. 11 reached 10° C. at about 16 hours. In the polystyrene box comparatives and control runs, the cold pack reached 10° C. at 11 hours (FIG. 10) and 13 hours (FIG. 11). In summary, the packages utilizing the composite dome sheets separated by kraft paper provided insulation performance superior to the polystyrene foam box, and the wrapped composite dome sheet/kraft paper combination provided superior insulation to the box surrounded by the composite dome sheet/kraft paper combination.

What is claimed is:

1. A cushioning article comprising a composite dome sheet which comprises a flap-cut sheet having a plurality of discrete sets of intersecting flap-cuts therein, with each set of intersecting flap-cuts providing a discrete set of flap members integral with the flap-cut sheet, with a plurality of individual flaps of each set extending outwardly from a portion of the flap-cut sheet that is between the sets of flap-cuts, with at least two of the outwardly extending flaps of each discrete set being affixed to a discrete cap member to provide a plurality of composite domes extending from the flap-cut sheet,
wherein the cap members are present in a cap-cut sheet, with each cap member having a discrete set of cap-cuts therearound, with each cap-cut in each set defining a portion of an edge of a discrete cap member, with each cap member being integral with the cap-cut sheet, with a plurality of cap members extending outwardly from a portion of the cap-cut sheet between the cap members, with the size and arrangement of the cap members substantially corresponding with the size and arrangement of discrete sets of flap-cuts in the flap-cut sheet, with the outwardly extending cap members being affixed by directly bonding to the outwardly extending flap members of the flap-cut sheet,
wherein the composite domes have a continuous spheroid shape.

2. The cushioning article according to claim 1, wherein the flap-cut sheet comprises cellulose and the cap members comprise cellulose.

3. The cushioning article according to claim 2, wherein the flap-cut sheet is made from paper having a thickness of from 0.001 inch to 0.07 inch and the cap members are also made from paper having a thickness of from 0.001 inch to 0.07 inch.

4. The cushioning article according to claim 3, wherein the cap members are affixed to the flaps with an adhesive.

5. The cushioning article according to claim 3, wherein the outwardly extending cap members are affixed to the flaps by heat sealing.

6. The cushioning article according to claim 1, wherein the composite domes have a spheroid shape selected from the group consisting of circular spheroid, oblate spheroid, and prolate spheroid.

7. The cushioning article according to claim 1, wherein each discrete set of intersecting flap-cuts comprises three straight cuts of equal length, with each cut intersecting the other two cuts at a lesser included angle of sixty degrees.

8. The cushioning article according to claim 1, wherein each discrete cap member is adhered to a top surface of each discrete set of outwardly extending flaps.

9. The cushioning article according to claim 1, wherein each discrete cap member is adhered to a bottom surface of each discrete set of outwardly extending flaps.

10. The cushioning article according to claim 1, wherein the set of intersecting cuts produces a first flap member, a second flap member, a third flap member, and a fourth flap member, with the first and third flap members extending outward from a first side of the flap-cut sheet, the first and third flap members being affixed to a first cap member adhered to the first side of the flap-cut sheet, and the second and fourth flap members extending outward from a second side of the flap-cut sheet, the second and fourth flap members being affixed to a second cap member adhered to the second side of the flap-cut sheet.

11. The cushioning article according to claim 1, wherein the flexible flap-cut sheet comprises a first thermoplastic polymer and the cap member comprises a second thermoplastic polymer.

12. The cushioning article according to claim 11, wherein the first thermoplastic polymer comprises at least one member selected from the group consisting of polyester, polyamide, polystyrene, polylactic acid, polyvinylchloride, and polyolefin, and the second thermoplastic polymer comprises at least one member selected from the group consisting of polyester, polyamide, polystyrene, polylactic acid, polyvinylchloride, and polyolefin.

13. The cushioning article according to claim 11, wherein the cap members are directly bonded to the flap members.

14. The cushioning article according to claim 11, wherein the cap members are heat sealed to the flap members.

15. The cushioning article according to claim 11, wherein the cap members are affixed to the flap members with an adhesive.

16. The cushioning article according to claim 11, wherein the composite domes have a spheroid shape selected from the group consisting of circular spheroid, oblate spheroid, and prolate spheroid.

17. The cushioning article according to claim 11, wherein the flap-cut sheet has a thickness of from 0.001 inch to 0.07 inch and the cap member has a thickness of from 0.001 inch to 0.07 inch.

18. The cushioning article according to claim 11, wherein each discrete set of intersecting flap-cuts comprises three straight cuts of equal length, with each cut intersecting the other two cuts at a lesser included angle of sixty degrees.

19. The cushioning article according to claim 11, wherein the set of intersecting flap-cuts produces a first flap member, a second flap member, a third flap member, and a fourth flap member, with the first and third flap members extending outward from a first side of the flap sheet, the first and third flap members being affixed to a first cap member adhered to the first side of the flap-cut sheet, and the second and fourth flap members extending outward from a second side of the flap-cut sheet, the second and fourth flap members being affixed to a second cap member adhered to the second side of the flap-cut sheet.

20. A cushioning and thermal protection packaging article for packaging a thermally-sensitive product, the packaging article comprising: (A) a plurality of composite dome sheets comprising a plurality of layers of at least one flap-cut sheet, the at least one flap-cut sheet having a plurality of discrete sets of intersecting flap-cuts therein, with each set of intersecting flap-cuts providing a discrete set of flap members integral with the flap-cut sheet, with a plurality of individual flaps of each set extending outwardly from a portion of the flap-cut sheet that is between the sets of flap-cuts, with the plurality of the outwardly extending flaps of each discrete set of flaps being affixed to a discrete cap member to provide a plurality of composite domes extending from the portion of the flap-cut sheet between the flaps; and (B) a separating sheet between each of the layers of the at least one flap-cut sheet comprising the composite domes,
wherein the cap members are present in a cap-cut sheet, with each cap member having a discrete set of cap-cuts therearound, with each cap-cut in each set defining a portion of an edge of a discrete cap member, with each cap member being integral with the cap-cut sheet, with a plurality of cap members extending outwardly from a portion of the cap-cut sheet between the cap members, with the size and arrangement of the cap members substantially corresponding with the size and arrangement of discrete sets of flap-cuts in the flap-cut sheet, with the outwardly extending cap members being affixed by directly bonding to the outwardly extending flap members of the flap-cut sheet,
wherein the composite domes have a continuous spheroid shape.

21. The cushioning and thermal protection packaging article according to claim 20, wherein the flap-cut sheet is made from paper having a thickness of from 0.001 inch to 0.07 inch and each cap member is made from paper having a thickness of from 0.001 inch to 0.07 inch, and the separating sheets are made from paper having a thickness of from 0.001 inch to 0.07 inch.

22. The cushioning and thermal protection packaging article according to claim 21, comprising from 2 to 10 layers of the at least one flap-cut sheet configured to surround six sides of a rectangular box holding a thermally-sensitive product.

23. The cushioning and thermal protection packaging article according to claim 21, comprising from 2 to 10 layers of the at least one separating or flap-cut sheet configured to wrap around a thermally-sensitive product.

24. The cushioning and thermal protection packaging article according to claim 21, wherein the outwardly extending cap members are affixed to the flaps with an adhesive.

25. The cushioning and thermal protection packaging article according to claim 21, wherein the outwardly extending cap members are affixed to the flaps by heat sealing.

* * * * *